(12) United States Patent
Lanzone et al.

(10) Patent No.: US 11,921,337 B2
(45) Date of Patent: Mar. 5, 2024

(54) SEALING UNIT FOR OPTICAL FIBER CABLE CABINET

(71) Applicant: Telefonaktiebolaget LM Ericsson (publ), Stockholm (SE)

(72) Inventors: Sergio Lanzone, Genoa (IT); Sergio Mosti, Genoa (IT); Claudio D'Incà, Genoa (IT); Angelo Rivara, Genoa (IT); Marco Assale, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/264,543

(22) PCT Filed: Aug. 1, 2018

(86) PCT No.: PCT/EP2018/070917
§ 371 (c)(1),
(2) Date: Jan. 29, 2021

(87) PCT Pub. No.: WO2020/025134
PCT Pub. Date: Feb. 6, 2020

(65) Prior Publication Data
US 2021/0311275 A1  Oct. 7, 2021

(51) Int. Cl.
*G02B 6/44* (2006.01)
*G02B 6/46* (2006.01)

(52) U.S. Cl.
CPC ............. *G02B 6/4444* (2013.01); *G02B 6/46* (2013.01)

(58) Field of Classification Search
CPC ................................ G02B 6/4444; G02B 6/46
See application file for complete search history.

(56) References Cited

U.S. PATENT DOCUMENTS

| 5,883,333 A | 3/1999 | Wambeke et al. |
| 5,886,300 A | 3/1999 | Strickler |

(Continued)

FOREIGN PATENT DOCUMENTS

| WO | 2014035611 A1 | 3/2014 |
| WO | 2015108222 A1 | 7/2015 |

OTHER PUBLICATIONS

International Search Report and Written Opinion dated Apr. 16, 2019 for International Application No. PCT/EP2018/070917 filed on Aug. 1, 2018, consisting of 13-pages.

*Primary Examiner* — Sung H Pak
*Assistant Examiner* — Hoang Q Tran
(74) *Attorney, Agent, or Firm* — Christopher & Weisberg, P.A.

(57) ABSTRACT

A sealing unit for a cabinet containing optical components. A gasket defines a plurality of apertures configured to provide a seal around a plurality of optical fiber cables, wherein the gasket has an interior side intended to face the interior of the cabinet and an exterior side intended to face an exterior of the cabinet. A first retaining device is located on the interior side of the gasket, and a second retaining device is located on the exterior side of the gasket. The first and second retaining devices each include a plurality of channels, wherein each channel is aligned with a respective aperture of the gasket and each channel is configured to receive one of the plurality of optical fiber cables. Each channel has a profile defined by a plurality of protruding surfaces configured to restrain longitudinal movement of an optical fiber cable received therein.

20 Claims, 7 Drawing Sheets

(56) References Cited

U.S. PATENT DOCUMENTS

| | | | | |
|---|---|---|---|---|
| 6,231,055 B1 * | 5/2001 | Dams | ................... | G02B 6/4471 |
| | | | | 277/630 |
| 6,353,186 B1 | 3/2002 | Dams et al. | | |
| 7,600,721 B2 * | 10/2009 | Vermeer | ................... | H02G 1/14 |
| | | | | 140/123 |
| 2006/0153362 A1 * | 7/2006 | Bloodworth | ......... | G02B 6/4448 |
| | | | | 379/413.02 |
| 2008/0205843 A1 | 8/2008 | Castonguay et al. | | |
| 2012/0057835 A1 | 3/2012 | Bryon et al. | | |
| 2013/0209049 A1 * | 8/2013 | Kowalczyk | .......... | G02B 6/4457 |
| | | | | 385/135 |
| 2016/0139346 A1 * | 5/2016 | Bund | ................... | G02B 6/4441 |
| | | | | 385/56 |
| 2018/0031795 A1 * | 2/2018 | Al Ghossein | .......... | G02B 6/483 |
| 2018/0157002 A1 * | 6/2018 | Bishop | ................. | G02B 6/4441 |

* cited by examiner

SEALING UNIT FOR OPTICAL FIBER CABLE CABINET

CROSS-REFERENCE TO RELATED APPLICATIONS

This application is a Submission Under 35 U.S.C. § 371 for U.S. National Stage Patent Application of International Application Number: PCT/EP2018/070917, filed Aug. 1, 2018 entitled "SEALING UNIT FOR OPTICAL FIBER CABLE CABINET," the entirety of which is incorporated herein by reference.

TECHNICAL FIELD

This relates to a sealing unit, and more specifically to a sealing unit for a cabinet containing optical components, where optical fiber cables extend between an interior and exterior of the cabinet.

BACKGROUND

Fiber optic cables are widely used to carry signals from one component of a network to another component.

FIG. 1 shows the interior of a cabinet 10 containing optical components. In one example, the cabinet 10 is a part of a telecommunications network, in which optical fiber cables are used to carry signals between components of the network.

A gasket 12 is provided in one wall 14 of the cabinet 10. The gasket 12 defines a plurality of apertures 16, through which cables 18 can be inserted, in a way that attempts to maintain a watertight seal of the cabinet 10. One or more optical fiber 20 within each cable 18 are then connected to respective connectors 22, and these connectors are then coupled to the optical components (not shown in FIG. 1).

A cable guide device 24 is provided on an interior surface of the cabinet wall 14. The cable guide device 24 includes multiple cable guides 26, into which the respective cable 18 is inserted. The cable guide 26 has the effect that the cable 18 is held generally in alignment with the respective aperture 16 as it enters the cabinet 10.

Each cable 18 is provided with a respective collar 28, which is sized such that it has a larger diameter than the cable guide 26. Thus, the collar 28 prevents the cable 18 from being pulled out of the cabinet 10 from the exterior thereof. However, this does not prevent the cable from being pushed into the cabinet. The freedom of the cable to move means that it can bend, for example because of the force of the wind, and means that the waterproofing of the cabinet is compromised.

FIG. 2 shows the arrangement of FIG. 1 in greater detail.

It will be noted that the length of the optical fiber, between the cable guide device 24 and the connector 22, will be different for each cable, because it will depend on the distance between the position of the aperture 16 through which the cable is inserted and on the position of the connector 22.

Each fiber has a minimum bending radius, which means that the cable may not be bent in a tight curve, and so the cable must be provided with fibers that are long enough to accommodate this. However, it is also disadvantageous to provide a single type of cable with fibers that are long enough to be used for all possible positions of the aperture 16 and the connector 22, because this will generally mean that there is excess fiber length that cannot easily be accommodated in the cabinet 10.

Therefore manufacturers may provide many different types of cable, having different lengths of fiber protruding from the collar 28, and the requirement to stock these different types of cable, and to select the appropriate one for each aperture 16 and connector 22, is inconvenient.

SUMMARY

According to an aspect of the present disclosure, there is provided a sealing unit for a cabinet containing optical components. The sealing unit comprises: a gasket defining a plurality of apertures configured to provide a seal around a plurality of optical fiber cables, wherein the gasket has an interior side intended to face the interior of the cabinet and an exterior side intended to face an exterior of the cabinet; a first retaining device which is located on the interior side of the gasket; and a second retaining device which is located on the exterior side of the gasket. The first and second retaining devices each comprise a plurality of channels, wherein each channel is aligned with a respective aperture of the gasket and each channel is configured to receive one of the plurality of optical fiber cables. Each channel has a profile defined by a plurality of protruding surfaces configured to restrain longitudinal movement of an optical fiber cable received therein.

The gasket may comprise two separable parts, wherein the two separable parts define the apertures when engaged together.

The plurality of protruding surfaces of each channel may comprise one or more first protruding surfaces along a first side thereof and one or more second protruding surfaces along a second side thereof.

The first and second protruding surfaces may be longitudinally offset from each other along a length of the channel.

There may be at least two first protruding surfaces and at least two second protruding surfaces.

In some embodiments, a first group of the channels lie in a first plane, a second group of channels lie in a second plane parallel to the first plane, and a third group of the channels lie on a curved surface that joins the first and second planes.

In any of the above embodiments, each channel may have a length greater than 10 mm, or greater than 15 mm.

According to another aspect, there is provided a cabinet containing optical components, comprising a sealing unit according to the first aspect, wherein the cabinet comprises a base section and a lid section that are movable relative to each other between an open position and a closed position.

At least a part of the gasket may be mounted to the base section of the cabinet with the interior side facing the interior of the cabinet and the exterior side facing the exterior of the cabinet.

The cabinet may comprise a further sealing device mounted to the lid section of the cabinet such that, when the lid section is in the closed position, the further sealing device comes into engagement with the second retaining device.

The first retaining device may be fixed to a first side of a wall of the cabinet, and the second retaining device may be fixed to a second side of the wall of the cabinet, opposite the first retaining device.

An aspect of the disclosure further provides a method of installing optical fiber cables in a sealing unit of a cabinet containing optical components. For example, the sealing unit comprising a gasket defining a plurality of apertures configured to provide a seal around a plurality of optical fiber cables, wherein the gasket has an interior side intended to face the interior of the cabinet and an exterior side intended to face an exterior of the cabinet, a first retaining device which is located on the interior side of the gasket; and a second retaining device which is located on the exterior side of the gasket; wherein the first and second retaining devices each comprise a plurality of channels. Each channel is aligned with a respective aperture of the gasket and each channel is configured to receive one of the plurality of optical fiber cables. Each channel has a profile defined by a plurality of protruding surfaces configured to restrain longitudinal movement of an optical fiber cable received. The method comprises inserting one of the plurality of optical fiber cables into an aligned channel of the first retaining device, second retaining device and aperture of the gasket.

The sealing device has the advantage that the sealing, e.g. watertightness, of the cabinet can be maintained, while keeping the fiber optic cables in their intended positions.

BRIEF DESCRIPTION OF DRAWINGS

For a better understanding of the present disclosure, and to show more clearly how it may be carried into effect, reference will now be made, by way of example, to the following drawings, in which.

DETAILED DESCRIPTION

Figure 1:
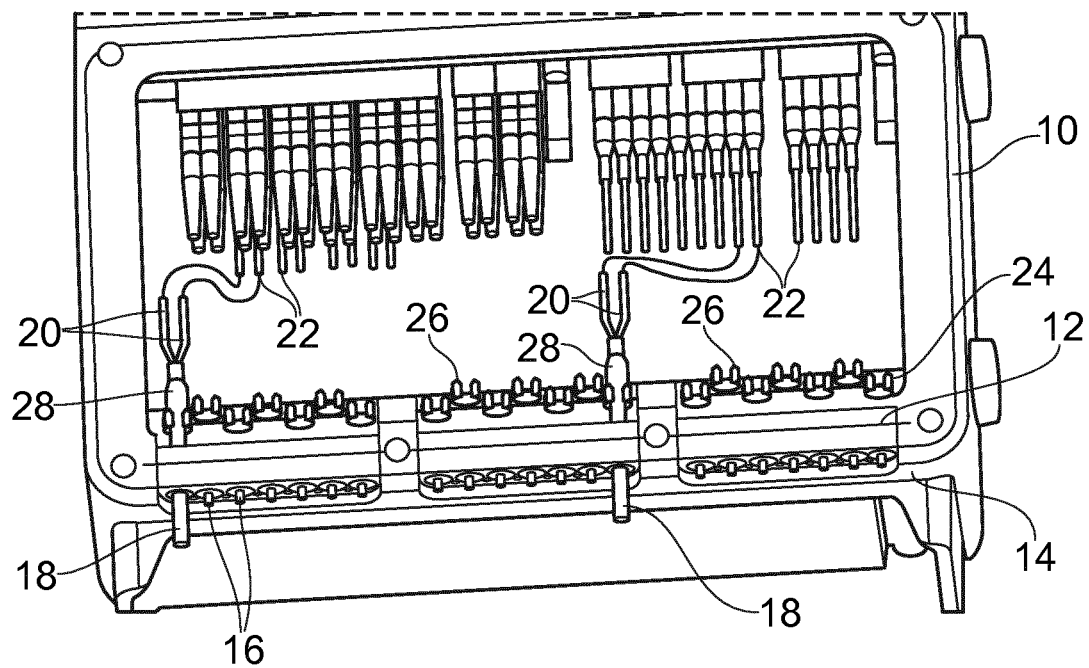
FIG. 1 shows a prior art interior of a cabinet containing optical components.
Figure 2:
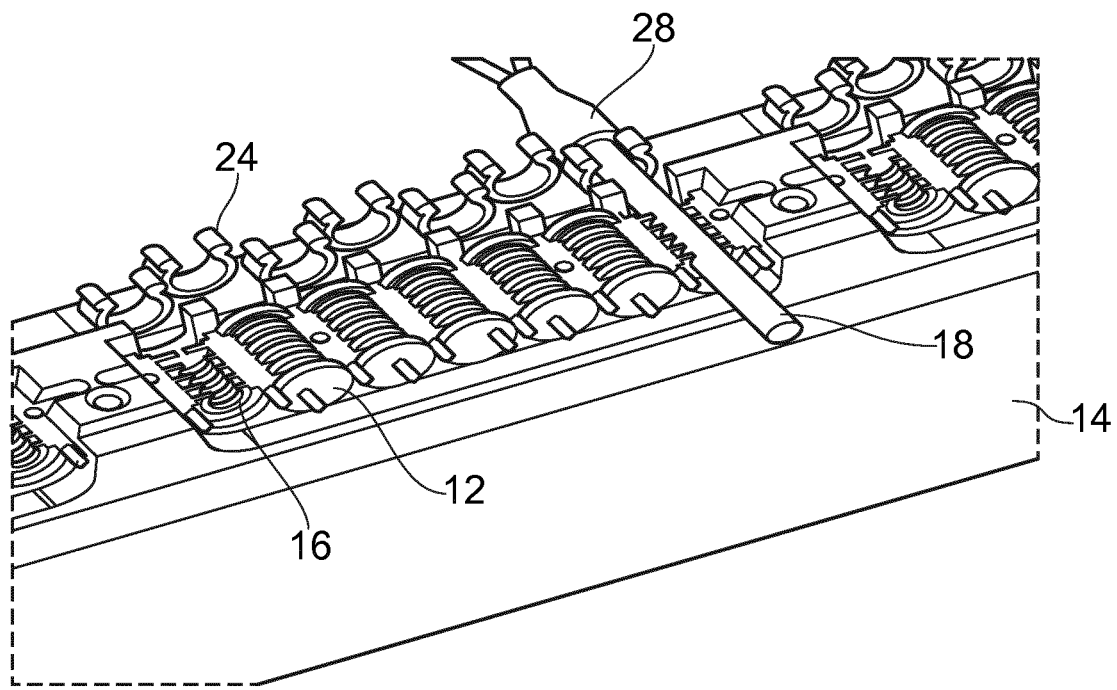
FIG. 2 shows a prior art sealing unit in the unit of FIG. 1.
Figure 3:
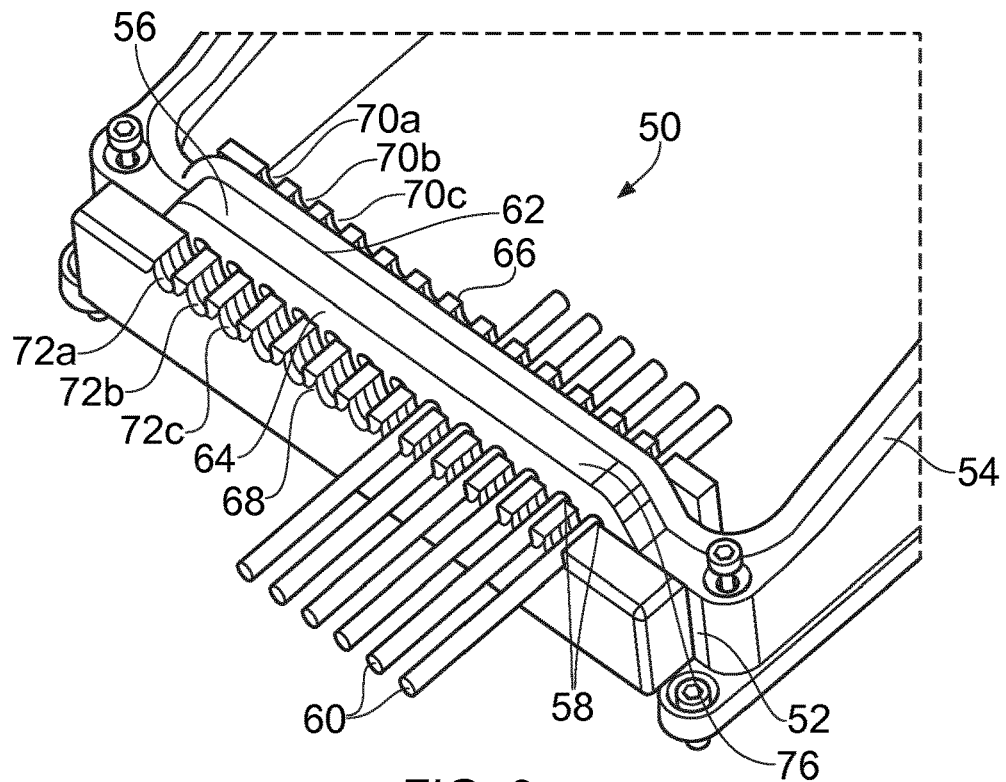
FIG. 3 shows a sealing unit in accordance with an aspect of the present disclosure.

FIG. 3 shows a sealing unit 50 in accordance with an aspect of the present disclosure. The sealing unit 50 is provided in a wall 52 of a cabinet 54 that is intended to contain optical components.

The sealing unit 50 comprises a gasket 56 defining a plurality of apertures 58. Each aperture 58 is configured to provide a seal around a respective one of a possible plurality of optical fiber cables 60. The gasket has an interior side 62 facing the interior of the cabinet 54 and an exterior side 64 facing an exterior of the cabinet 54.

The sealing unit 50 further comprises a first retaining device 66, which is located on the interior side 62 of the gasket 56, and a second retaining device 68, which is located on the exterior side 64 of the gasket 56. The first retaining device 66 may be fixed, for example screwed, to an inside of the front wall of the cabinet 54, while the second retaining device 68 may similarly be fixed, for example screwed, to an outside of the front wall of the cabinet 54. In some examples, the first retaining device 66 and/or second retaining device 68 is adjacent, e.g. abutting, the gasket 56.

The first retaining device 66 comprises a plurality of channels 70, e.g. channels 70a, 70b, 70c, etc, wherein each channel is aligned with an aperture 58 of the gasket and each channel is configured to receive one of the plurality of optical fiber cables 60. Similarly, the second retaining device 68 comprises a plurality of channels 72, e.g. channels 72a, 72b, 72c, etc, wherein each channel is aligned with an aperture 58 of the gasket and each channel is configured to receive one of the plurality of optical fiber cables 60.

Thus, starting from the exterior of the cabinet 54, each cable extends through a channel 72 of the second retaining device 68, an aperture 58 of the gasket 56, and through a channel 70 of the first retaining device 66.

Each channel 70 of the first retaining device 66, and each channel 72 of the second retaining device 68, has a profile defined by a plurality of protruding surfaces configured to restrain longitudinal movement of an optical fiber cable received therein.

The channels 70, 72 are dimensioned to provide for a press-fitting of the optical fiber cable into the channel of the respective retaining device. The first retaining device 66 and second retaining device 68 restrain the optical fiber cables from being pushed or pulled in their longitudinal direction. As such, the fiber optical cables are secured in both lateral and longitudinal directions.

Figure 4:
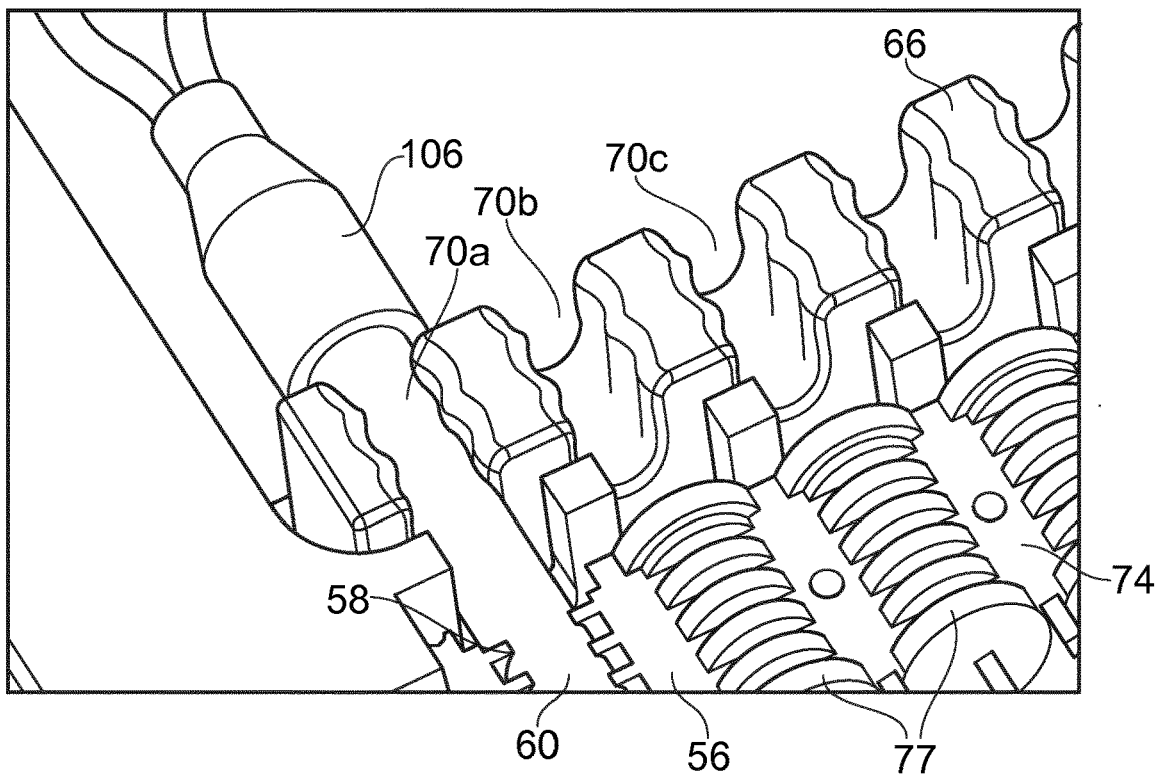
FIG. 4 shows in more detail a part of the sealing unit of FIG. 3.
Figure 5:
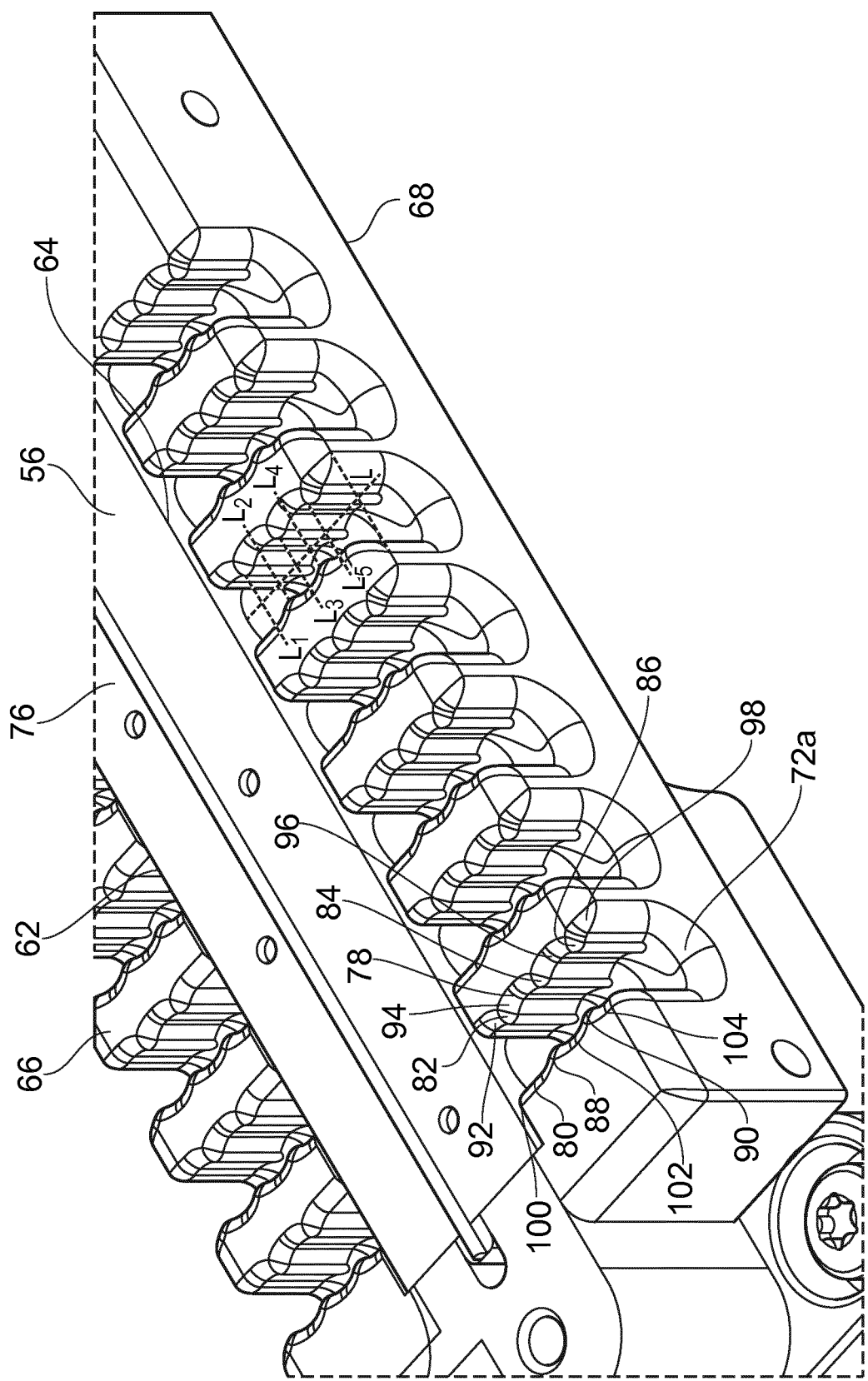
FIG. 5 shows in more detail a part of the sealing unit of FIG. 3.

The shape of the channels 70, 72 that produces this effect is shown in more detail in FIGS. 4 and 5.

FIG. 4 shows in more detail a part of the sealing unit of FIG. 3. Specifically, FIG. 4 shows a part of the gasket 56, with an aperture 58, and a corresponding channel 70a of the first retaining device 66.

In this embodiment, the gasket 56 comprises two separable parts, namely a lower part 74 and an upper part 76, where only the lower part 74 is shown in FIG. 4, and where the upper part 76 is visible in FIG. 3. The lower part 74 has channels running through it, and the upper part 76 has correspondingly located channels, so that the two separable parts of the gasket 56 define the apertures 58 when engaged together. References to "lower" and "upper" are not intended to limit the gasket, and the gasket may be installed in the cabinet in alternative orientations.

FIG. 4 also shows that, when no cable is present in one of the apertures of the gasket 56, a cable plug 77 is inserted into the aperture, in order to ensure sealing of the gasket.

FIG. 5 also shows in more detail a part of the sealing unit of FIG. 3. FIG. 5 shows the situation where the upper part 76 of the gasket 56 is engaged with the lower part 74.

As mentioned above, FIGS. 4 and 5 show one possible embodiment of the shape of the channels 70, 72 that produces the effect that the cable cannot be pushed or pulled in its longitudinal direction, when it has been press-fitted into the channel 70, 72 of the respective retaining device.

The shape is described with particular reference to the channel 72a of the second retaining device 68, as shown in FIG. 5. However, each of the channels 70, 72 may have the same shape. Any feature described for the channel 72 is also applicable to the channel 70, and vice versa.

The channel 72a has a length L, from the a side adjacent the gasket, to the opposite edge of the restraining device, i.e. the length L of the channel along the longitudinal direction of the fiber optical cable. The length L may for example be greater than 10 mm, or greater than 15 mm.

The channel 72a has a first side 78 and a second side 80. As mentioned above, the profile of the channel 72a is defined by a plurality of protruding surfaces that are configured to restrain longitudinal movement of an optical fiber cable received therein.

As can be seen in FIG. 5, there are three protruding surfaces 82, 84, 86 along the first side 78 of the channel 72a, and two protruding surfaces 88, 90 along the second side 80 of the channel 72a. Thus, in this embodiment, there is at least one protruding surface on each opposing side surface of the channel, though in other embodiments there may be protruding surfaces on only one side of the channel. The protruding surfaces may be considered as extending laterally to define a protruding wall of the channel.

The protruding surfaces are separated by indentations, in a longitudinal direction of the optical fiber cable. Thus, on the first side 78 there is an indentation 92 between the inner end of the channel 72a and the protruding surface 82; an indentation 94 between the protruding surfaces 82, 84; an indentation 96 between the protruding surfaces 84, 86; and an indentation 98 between the protruding surface 86 and the outer end of the channel 72a. Similarly, on the second side 80 there is an indentation 100 between the inner end of the channel 72a and the protruding surface 88; an indentation 102 between the protruding surfaces 88, 90; and an indentation 104 between the protruding surface 90 and the outer end of the channel 72a. The protruding surfaces and indentations define variations in the opposing walls of the channels 70,72 which is perpendicular, i.e. lateral, to the longitudinal direction of the channels 70,72 or optic fiber cable.

In some examples, the indentations are concave, such that the protruding surfaces comprise an apex with concave sides. More generally, each protruding surface may comprise a series of curved projections, or a row of sections of a curve or circle.

Alternatively, the indentations may have U-shaped or V-shaped profiles in the longitudinal direction, or any other suitable profile.

As also shown in FIG. 5, in this embodiment, the protruding surfaces on the first and second sides are longitudinally offset from each other along a length of the channel. As such, the protruding surfaces on each side of the channel are not aligned.

Thus, the protruding surfaces 82, 84, 86 along the first side 78 of the channel 72a are at respective distances L1, L3, and L5 from the relevant side of the gasket, while the two protruding surfaces 88, 90 along the second side 80 of the channel 72a are at respective distances L2, and L4 from the relevant side of the gasket, where:

$$L_1 < L_2 < L_3 < L_4 < L_5.$$

In this embodiment, there are three protruding surfaces 82, 84, 86 along the first side 78 of the channel 72a, and two protruding surfaces 88, 90 along the second side 80 of the channel 72a. In other embodiments, there may be more protruding surfaces or there may be fewer. However, in many embodiments, there are at least two protruding surfaces along the first side of the channel and at least two protruding surfaces along the second side of the channel.

An effect is that each channel has a profile in which a width of the channel varies slightly along its length. In some aspects, the channel has a profile which requires the optical fiber cable to deform, e.g. the profile urges the optical fiber cable against the protruding surfaces. This provides for a secure attachment of the optical fiber cable within the channel.

The first and second retaining devices 66, 68 may be made of any suitable material, for example a suitable plastic material, or rubber of a suitable degree of hardness and resiliency. The cables 60 that are used in these cabinets have a somewhat resilient outer coating. This means that, when the cables are inserted into the retaining devices, the coating becomes compressed at locations corresponding to the protruding surfaces of the channels. This helps to restrict the longitudinal movement of the cables.

The result is that, although FIG. 4 shows a collar 106 on the cable 60, and the collar is close to the retaining device 66, the collar 106 is not in contact with the retaining device 66, and plays no part in restricting the longitudinal movement of the cable.

This means that the cable can be held in place at any desired position along its length, which in turn means that each cable can be held in place at the position that leaves the desired fiber length between the gasket and the connector within the cabinet to which that cable needs to be connected. Thus, the fibers can easily be placed and held in their intended locations. This allows the cables to be connected to the intended connector within the cabinet, while maintaining a radius of curvature that exceeds a stated minimum radius. For example, the retaining devices do not require a collar in order to restrain the cable securely in position. This avoids the need for the correct placement of a collar, e.g. by use of different cables having different collar positions, in order to connect to the required part of the optical components whilst maintaining a minimum radius of curvature.

In the illustrated embodiment, where the gasket 56 is formed of two separable parts, the cables 60 are placed at their desired longitudinal positions within the lower part 74 of the gasket, then press-fitted into the first and second retaining devices 66, 68, and then the upper part 76 of the gasket is brought into engagement with the lower part 74 in order to provide the required seal around the cables.

Figure 6:
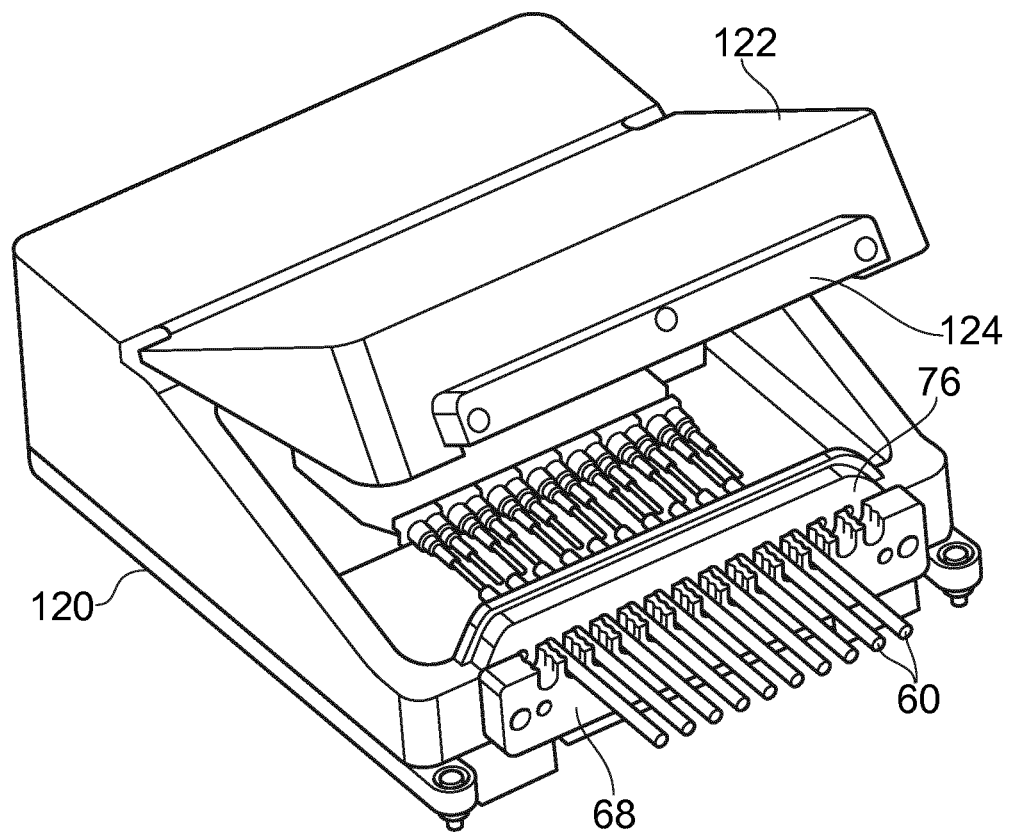
FIG. 6 shows a cabinet including the sealing unit of FIGS. 3-5.

FIG. 6 shows a cabinet including the sealing unit of FIGS. 3-5. Aspects of the disclosure may comprise a cabinet comprising the sealing unit according to any example.

In some examples, FIG. 6 shows a cabinet 120 having a lid 122 that is pivotable with respect to the cabinet main body. In FIG. 6, the lid is pivoted into a partly open position. FIG. 6 shows the situation where the upper part 76 of the gasket has been brought into engagement with the lower part 74 to provide the required seal around the cables. The lower part 74 of the gasket is obscured by the second retaining device 68.

Figure 7:
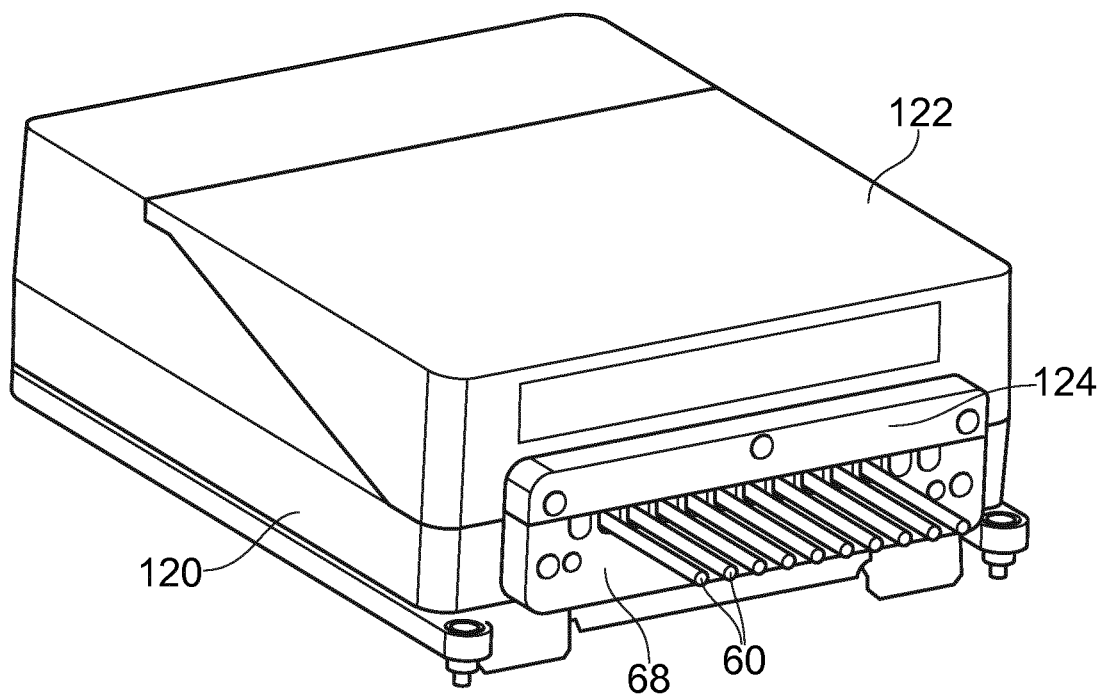
FIG. 7 shows the cabinet of FIG. 6.

FIG. 6 also shows a further sealing device 124, which is provided on the exterior side of the lid 122, and which co-operates with the second retaining device 68 to provide further stability for the cables 60 and/or further sealing of the cabinet. FIG. 7 shows the cabinet of FIG. 6, with the lid 122 pivoted into the closed position. In this position, the further sealing device 124 comes into engagement with the second retaining device 68.

Figure 8:
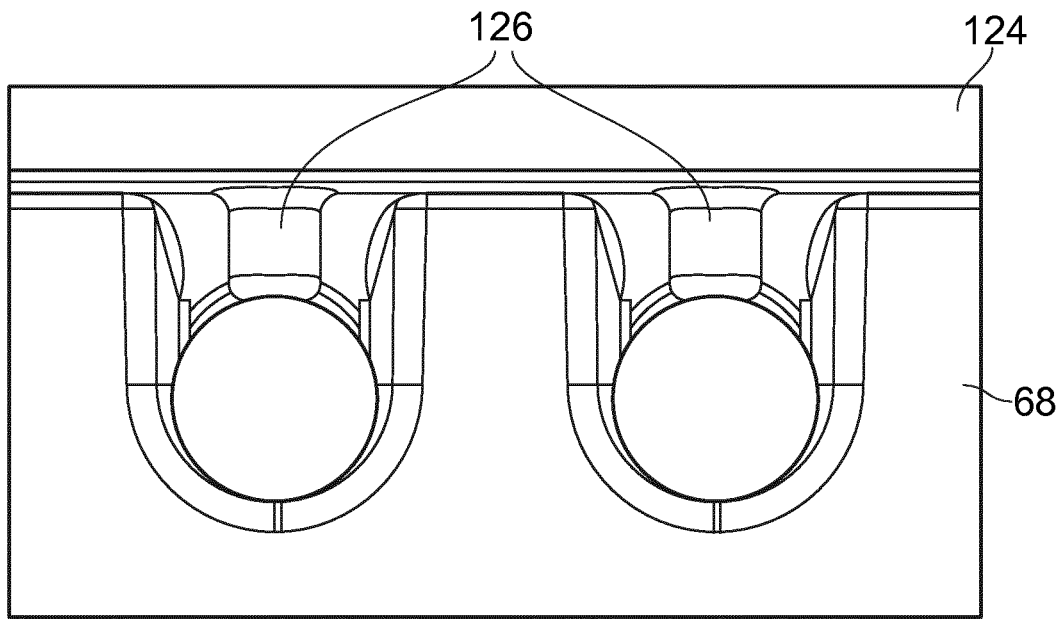
FIG. 8 shows in more detail a part of the cabinet of FIGS. 6 and 7.

FIG. 8 shows in more detail a part of the cabinet of FIGS. 6 and 7. Specifically, FIG. 8 is a cross-sectional view, with the lid 122 pivoted into the closed position, showing the further sealing device 124 co-operating with the second retaining device 68. In this example, the further sealing device 124 comprises protrusions 126, which extend into the channels in the second retaining device 68, in order to provide the further stability for the cables 60 and/or further sealing of the cabinet.

FIG. 6 shows an embodiment in which the upper part 76 of the gasket has been brought into engagement with the lower part 74 to provide the required seal around the cables, while the lid 122 is pivoted into a partly open position. In other embodiments, the upper part 76 of the gasket may be secured to the lid 122 so that the cables may be inserted into the apertures while the lid is in a partly open position, and then, when the lid 122 is brought into the closed position, as shown in FIG. 7, the upper part 76 of the gasket is automatically brought into engagement with the lower part 74 to provide the required seal around the cables.

Figure 9:
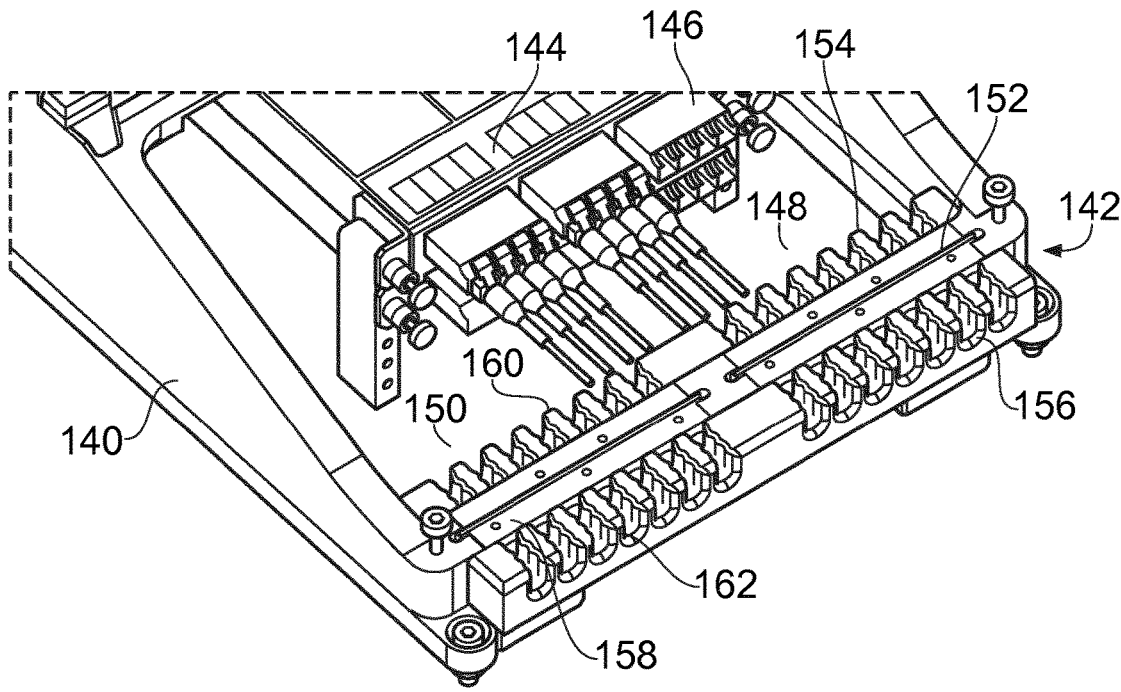
FIG. 9 shows an interior of a cabinet including an alternative sealing unit.

FIG. 9 shows an interior of a cabinet 140 including an alternative sealing unit 142. In this embodiment, as well as in other described embodiments, the cabinet 140 may be a part of a telecommunications network. For example, the cabinet 140 may contain optical modules used to provide a fronthaul connection between one or more remote radio head (or remote radio unit, RRU) and a centralized baseband controller (i.e. baseband unit or digital unit). Alternatively, the cabinet may comprise any optical transport equipment or optical interfaces.

The one or more remote radio head (for example a group of three radios providing service to respective cell sectors from a radio base station) has a fiber optic connection to the separate baseband unit, e.g. using a Common Public Radio Interface (CPRI). In some examples, the optical component connected to by the optical fiber cables comprises a passive optical filter. In a further example, the optical component comprises a transceiver. The optical components, e.g. passive optical filter, then has a optical link (i.e. by a fiber optical cable) to the centralized controller (i.e. baseband unit), which may be located several kilometres away.

Such a device has a large number of optical interfaces. For example, one typical device may require up to 22 fiber optic cables to be connected. Since the equipment may be placed outdoors, the cabinet must be waterproof, and the cables must be protected from damage.

Thus, FIG. 9 shows the optical components 144, with several connections 146, to which optic fiber cables can be connected.

FIG. 9 shows that the sealing unit 142 is provided in two halves 148, 150, which can in fact be regarded as two distinct sealing units.

Thus, the sealing unit 148 comprises a gasket 152, which is a two-part gasket as described with reference to FIGS. 3-5, shown in FIG. 9 with the two separable parts engaged together, to define the apertures through the gasket.

The sealing unit 148 further comprises a first retaining device 154, which is located on the interior side of the gasket 152, and a second retaining device 156, which is located on the exterior side of the gasket 152.

Similarly, the sealing unit 150 comprises a gasket 158, which is a two-part gasket as described with reference to FIGS. 3-5, shown in FIG. 9 with the two separable parts engaged together, to define the apertures through the gasket.

The sealing unit 150 further comprises a first retaining device 160, which is located on the interior side of the gasket 158, and a second retaining device 162, which is located on the exterior side of the gasket 158, as described above.

In this embodiment, the channels defined by the respective first retaining devices 154, 160, and by the respective second retaining devices 156, 162, may have the same properties as the channel 72a described in detail with reference to FIG. 5. The other features of the respective first retaining devices 154, 160, and the respective second retaining devices 156, 162, may be the same as, or similar to, the features of the retaining devices shown in FIGS. 3-5, and described herein.

In the embodiments described so far, the apertures through the gasket lie on a straight line, and so all of the channels through the sealing unit lie in a plane. In other embodiments, the cables may be brought into the cabinet in a different arrangement.

Figure 10:
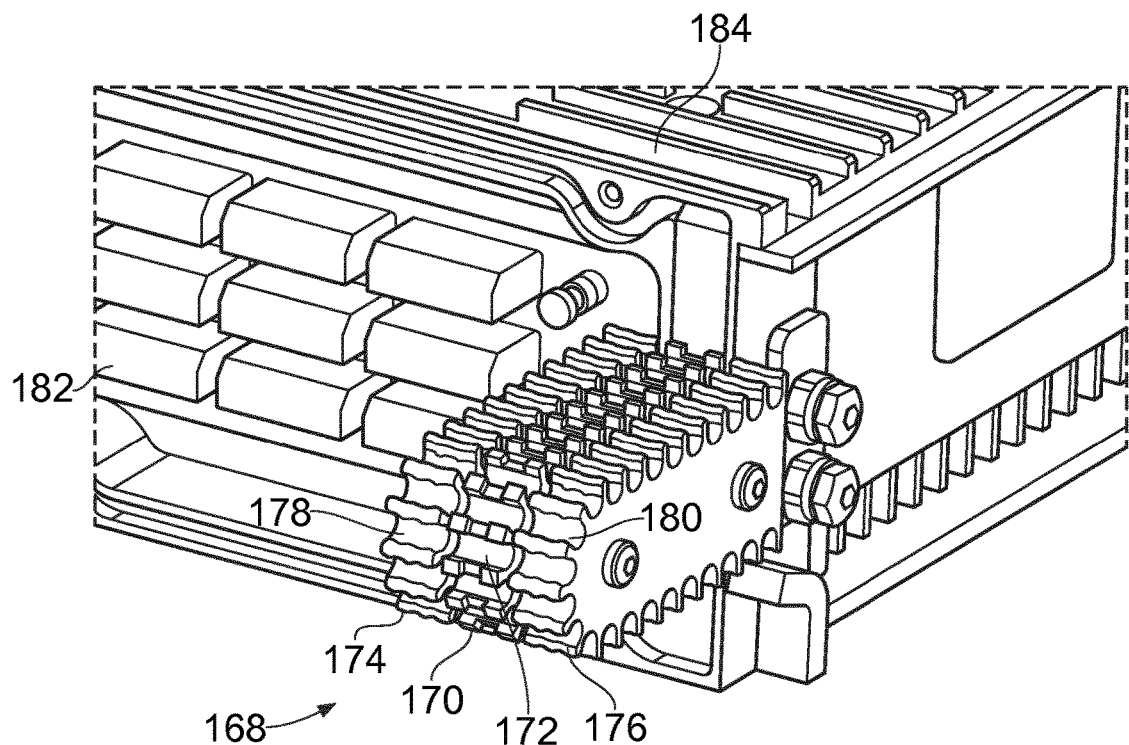
FIG. 10 shows an alternative sealing unit in accordance with an aspect of the present disclosure.

FIG. 10 shows an alternative sealing unit 168 in accordance with an aspect of the present disclosure. Specifically, FIG. 10 shows one part 170 of a gasket that is made up of two separable parts. The illustrated part 170 has channels, for example the illustrated channel 172, running through it, and a second part of the gasket (not shown in FIG. 10) can be brought into contact with the part 170, in order to define apertures for the cables, in such a way that there is a seal.

The illustrated part 170 of the gasket is in the shape of a U (lying on its side as shown), with a first set of channels lying in a first plane on a top surface, with a second set of channels lying in a second plane on a bottom surface, where the second plane is parallel to the first plane, and with a third set of channels on a curved surface that joins the first plane to the second plane.

The sealing unit 168 further comprises a first retaining device 174, which is located on the interior side of the gasket, and a second retaining device 176, which is located on the exterior side of the gasket.

The first retaining device 174 defines channels, such as the channel 178, which are aligned with apertures through the gasket, and the second retaining device 176 similarly defines channels, such as the channel 180, which are aligned with the apertures through the gasket.

Again, in this embodiment, the channels 178, 180, defined by the first retaining device 174 and by the second retaining device 176, may have the same properties as the channel 72a described in detail with reference to FIG. 5. The other features of the first retaining device 174 and the second retaining device 176 and gasket 170 may be the same as, or similar to, the features of the retaining devices shown in FIGS. 3-5, and described herein.

Thus, cables can be held in place by the first retaining device 174 and the second retaining device 176, and connected to the connectors 182, which are provided to allow connection to optical components 184.

Figure 11:
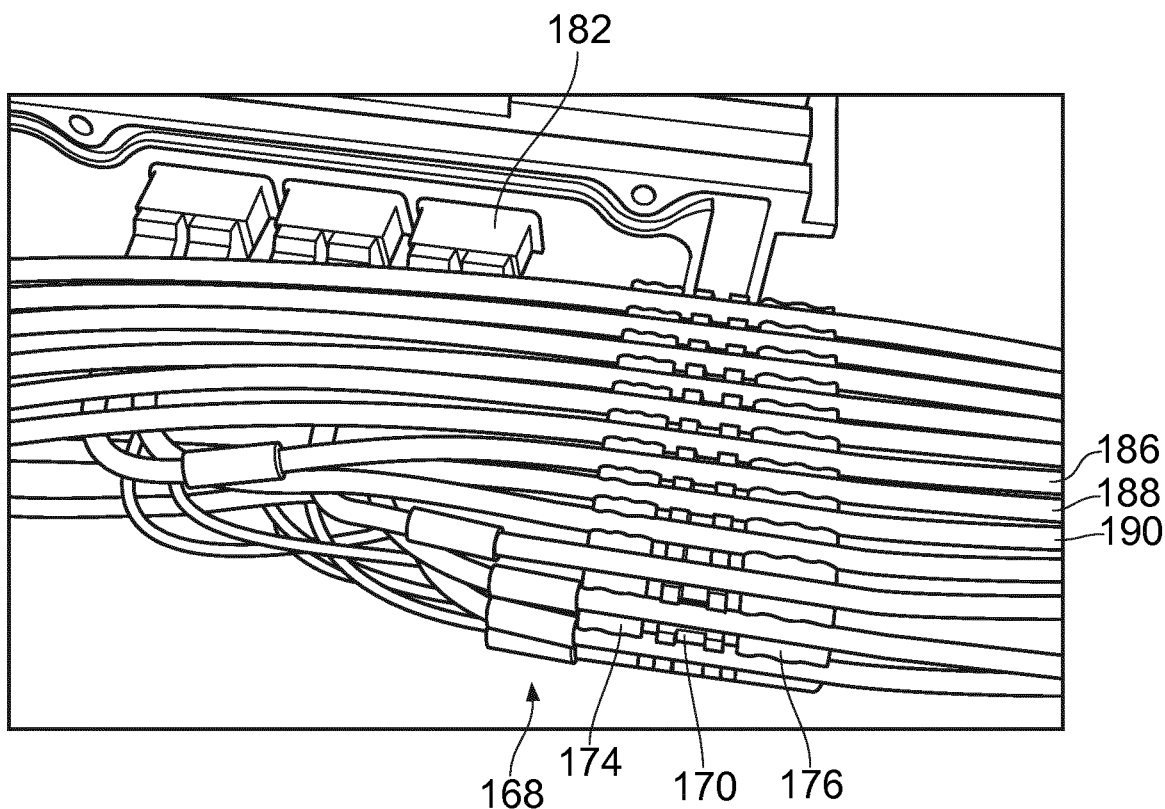
FIG. 11 shows in more detail a part of the sealing unit of FIG. 10.

FIG. 11 shows in more detail a part of the sealing unit of FIG. 10, with cables in place.

Specifically, FIG. 11 shows cables 186, 188, 190, etc, connected to the connectors 182. The sealing unit 168 comprises an inner part 170 of the gasket, before the outer part has been engaged therewith to fully define the apertures. The sealing unit 168 further comprises the first retaining device 174 and the second retaining device 176. As for any example, any collar on the cable is not required to retain the optical fiber cable in position. The first and second retaining devices secure the fiber optical cable in position. The optical fiber cable can therefore be selected and/or installed independently of a distance extended by the optical fiber cable within the cabinet, i.e. between the gasket and the optical connectors. As such, the optical fiber cable can be selected and/or installed independently of a distance between any collar and an end of the optical fibers.

Figure 12:
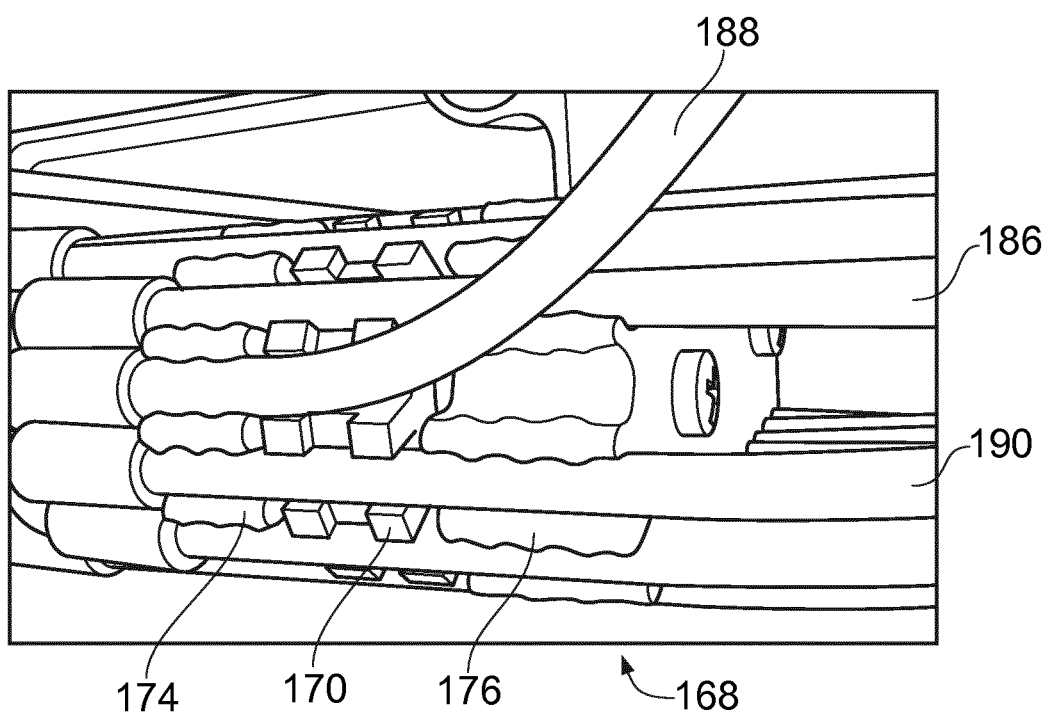
FIG. 12 shows in further detail a part of the sealing unit of FIG. 10.

FIG. 12 shows in further detail a part of the sealing unit of FIG. 10. Again, FIG. 12 shows cables 186, 188, 190, etc, with the sealing unit 168, which comprises the inner part 170 of the gasket, the first retaining device 174 and the second retaining device 176.

The cables 186, 190 are fully engaged in the inner part 170 of the gasket, and the first and second retaining devices 174, 176. However, the cable 188, while fully engaged in the first retaining device 174 and the inner part 170 of the gasket, has not yet been press-fitted into the second retaining device 176.

Thus, there are provided embodiments of sealing units that can seal a cabinet at points where cables enter and leave the cabinet, and can protect the cables from damage caused by bending etc., while also preventing the cables from being pulled out of the cabinet or pushed into the cabinet. The secure restraining of the optical fiber cables provided by the first and second restraining devices allows the gasket to function properly. Aspects of the disclosure further provide a cabinet comprising the sealing unit according to any example. An aspect of the disclosure further provides a method of installing optical fiber cables in a sealing unit of a cabinet containing optical components. The sealing unit is according to any example. For example, the sealing unit comprising a gasket defining a plurality of apertures configured to provide a seal around a plurality of optical fiber cables, wherein the gasket has an interior side intended to face the interior of the cabinet and an exterior side intended to face an exterior of the cabinet, a first retaining device which is located on the interior side of the gasket; and a second retaining device which is located on the exterior side of the gasket; wherein the first and second retaining devices each comprise a plurality of channels. Each channel is aligned with a respective aperture of the gasket and each channel is configured to receive one of the plurality of optical fiber cables. Each channel has a profile defined by a plurality of protruding surfaces configured to restrain longitudinal movement of an optical fiber cable received. The method comprises inserting one of the plurality of optical fiber cables into an aligned channel of the first retaining device, second retaining device and aperture of the gasket. For example, the optical fiber cables are pushed into the channels and an open aperture of the gasket, i.e. press-fitted in. In some aspects, a covering part of the gasket and/or first and second retaining device is then positioned around the fiber optical cables, e.g. prior to, or by, closing the lid of the cabinet.

The invention claimed is:

1. A sealing unit for a cabinet containing optical components, the sealing unit comprising:
    a gasket defining a plurality of apertures configured to provide a seal around a plurality of optical fiber cables, the gasket having an interior side to face the interior of the cabinet and an exterior side to face an exterior of the cabinet;
    a first retaining device located on the interior side of the gasket;
    a second retaining device located on the exterior side of the gasket;
    the first and second retaining devices each comprising a plurality of channels, each channel being aligned with a respective aperture of the gasket and each channel being configured to receive one of the plurality of optical fiber cables; and
    each channel having a profile defined by a plurality of protruding surfaces configured to restrain longitudinal movement of an optical fiber cable received therein without contact with a collar on the optical fiber cable, the protruding surfaces compressing a coating of the optical fiber cable when the optical fiber cable is inserted in the corresponding channel.

2. The sealing unit as claimed in claim 1, wherein the gasket comprises two separable parts, wherein the two separable parts define the apertures when engaged together.

3. The sealing unit as claimed in claim 1, wherein the plurality of protruding surfaces of each channel comprises one or more first protruding surfaces along a first side thereof and one or more second protruding surfaces along a second side thereof.

4. The sealing unit as claimed in claim 3, wherein the first and second protruding surfaces are longitudinally offset from each other along a length of the channel.

5. The sealing unit as claimed in claim 3, wherein there are at least two first protruding surfaces and at least two second protruding surfaces.

6. The sealing unit as claimed in claim 1, wherein a first group of the channels lie in a first plane, a second group of channels lie in a second plane parallel to the first plane, and a third group of the channels lie on a curved surface that joins the first and second planes.

7. The sealing unit as claimed in claim 1, wherein each channel has one of a length greater than 10 mm and a length greater than 15 mm.

8. A cabinet containing optical components, the cabinet comprising:
    a sealing unit, the sealing unit comprising:
        a gasket defining a plurality of apertures configured to provide a seal around a plurality of optical fiber cables, the gasket having an interior side to face the interior of the cabinet and an exterior side to face an exterior of the cabinet;
        a first retaining device located on the interior side of the gasket;
        a second retaining device located on the exterior side of the gasket;
        the first and second retaining devices each comprising a plurality of channels, each channel being aligned with a respective aperture of the gasket and each channel being configured to receive one of the plurality of optical fiber cables; and
        each channel having a profile defined by a plurality of protruding surfaces configured to restrain longitudinal movement of an optical fiber cable received therein without contact with the collar on the optical fiber cable, the protruding surfaces compressing a coating of the optical fiber cable when the optical fiber cable is inserted in the corresponding channel;
    a base section; and
    a lid section, the base section and the lid section being movable relative to each other between an open position and a closed position.

9. The cabinet as claimed in claim 8, wherein at least a part of the gasket is mounted to the base section of the cabinet with the interior side facing the interior of the cabinet and the exterior side facing the exterior of the cabinet.

10. The cabinet as claimed in claim 8, comprising a further sealing device mounted to the lid section of the cabinet such that, when the lid section is in the closed position, the further sealing device comes into engagement with the second retaining device.

11. The cabinet as claimed in claim 8, wherein the first retaining device is fixed to a first side of a wall of the cabinet, and the second retaining device is fixed to a second side of the wall of the cabinet, opposite the first retaining device.

12. A method of installing optical fiber cables in a sealing unit of a cabinet containing optical components, the sealing unit comprising a gasket defining a plurality of apertures configured to provide a seal around a plurality of optical fiber cables, the gasket having an interior side to face the interior of the cabinet and an exterior side to face an exterior of the cabinet, a first retaining device which is located on the interior side of the gasket; and a second retaining device which is located on the exterior side of the gasket; the first and second retaining devices each comprising a plurality of channels, each channel being aligned with a respective aperture of the gasket and each channel being configured to receive one of the plurality of optical fiber cables, and each channel having a profile defined by a plurality of protruding surfaces configured to restrain longitudinal movement of an optical fiber cable received therein without contact with the collar on the optical fiber cable, the method comprising:

inserting one of the plurality of optical fiber cables into an aligned channel of the first retaining device, second retaining device and aperture of the gasket, the protruding surfaces compressing a coating of the optical fiber cable when the optical fiber cable is inserted into the aligned channel.

13. The sealing unit as claimed in claim 2, wherein the plurality of protruding surfaces of each channel comprises one or more first protruding surfaces along a first side thereof and one or more second protruding surfaces along a second side thereof.

14. The sealing unit as claimed in claim 13, wherein the first and second protruding surfaces are longitudinally offset from each other along a length of the channel.

15. The sealing unit as claimed in claim 14, wherein there are at least two first protruding surfaces and at least two second protruding surfaces.

16. The sealing unit as claimed in claim 13, wherein there are at least two first protruding surfaces and at least two second protruding surfaces.

17. The sealing unit as claimed in claim 13, wherein a first group of the channels lie in a first plane, a second group of channels lie in a second plane parallel to the first plane, and a third group of the channels lie on a curved surface that joins the first and second planes.

18. The sealing unit as claimed in claim 2, wherein a first group of the channels lie in a first plane, a second group of channels lie in a second plane parallel to the first plane, and a third group of the channels lie on a curved surface that joins the first and second planes.

19. The cabinet as claimed in claim 9, comprising a further sealing device mounted to the lid section of the cabinet such that, when the lid section is in the closed position, the further sealing device comes into engagement with the second retaining device.

20. The cabinet as claimed in claim 9, wherein the first retaining device is fixed to a first side of a wall of the cabinet, and the second retaining device is fixed to a second side of the wall of the cabinet, opposite the first retaining device.

\* \* \* \* \*